United States Patent
Ho

(10) Patent No.: US 12,074,662 B2
(45) Date of Patent: Aug. 27, 2024

(54) DETECTION CIRCUIT FOR DETECTING TRANSMISSION DIRECTIONALITY OF TRANSMISSION LINE

(71) Applicant: BENQ CORPORATION, Taipei (TW)

(72) Inventor: Shih-Chuan Ho, Taipei (TW)

(73) Assignee: BenQ Corporation, Taipei (TW)

( * ) Notice: Subject to any disclaimer, the term of this patent is extended or adjusted under 35 U.S.C. 154(b) by 7 days.

(21) Appl. No.: 18/177,763

(22) Filed: Mar. 3, 2023

(65) Prior Publication Data

US 2024/0235612 A1 Jul. 11, 2024

(30) Foreign Application Priority Data

Jan. 7, 2023 (TW) ................................. 112100667

(51) Int. Cl.
*H04B 3/46* (2015.01)
*H04B 3/20* (2006.01)

(52) U.S. Cl.
CPC .............. *H04B 3/46* (2013.01); *H04B 3/20* (2013.01)

(58) Field of Classification Search
CPC ... H04B 3/46; H04B 3/20; H04B 3/04; H04B 17/00; H04B 17/0085; H04B 17/15; H04B 17/18; H04B 17/19
See application file for complete search history.

(56) References Cited

U.S. PATENT DOCUMENTS

| | | | |
|---|---|---|---|
| 3,974,401 A * | 8/1976 | Eguchi ................. | H04M 1/654 327/487 |
| 10,623,057 B1 | 4/2020 | Bennett et al. | |
| 11,063,633 B2 | 7/2021 | Stuckman et al. | |
| 11,374,605 B1 * | 6/2022 | Tang ...................... | H04B 17/29 |
| 2019/0293704 A1 * | 9/2019 | Liu ........................ | H02H 3/042 |
| 2019/0341964 A1 * | 11/2019 | Jiang ...................... | H04B 3/46 |

FOREIGN PATENT DOCUMENTS

| | | |
|---|---|---|
| TW | 200718054 | 5/2007 |
| TW | 201238266 | 9/2012 |
| TW | M572086 | 12/2018 |

OTHER PUBLICATIONS

"Notice of allowance of Taiwan Counterpart Application", issued on Aug. 22, 2023, p. 1-p. 4.

* cited by examiner

*Primary Examiner* — Khanh C Tran

(57) ABSTRACT

A detection circuit for detecting a transmission directionality of a transmission line is provided. The detection circuit includes a sending terminal, a receiving terminal, a detection signal generator, a comparison circuit, and an output circuit. The sending terminal is connected to a first terminal of a transmission line. The receiving terminal is connected to a second terminal of the transmission line. The detection signal generator provides a detection signal to the sending terminal. The comparison circuit receives the detection signal and a transmission signal from the receiving terminal, and compares the detection signal and the transmission signal to generate a comparison result. The output circuit outputs one of a first detection result signal and a second detection result signal according to the comparison result.

14 Claims, 7 Drawing Sheets

DETECTION CIRCUIT FOR DETECTING TRANSMISSION DIRECTIONALITY OF TRANSMISSION LINE

CROSS-REFERENCE TO RELATED APPLICATION

This application claims the priority benefit of Taiwan application serial no. 112100667, filed on Jan. 7, 2023. The entirety of the above-mentioned patent application is hereby incorporated by reference herein and made a part of this specification.

BACKGROUND

Technical Field

The disclosure relates to a detection circuit and, in particular, to a detection circuit for detecting the transmission directionality of a transmission line.

Related Art

Generally speaking, transmission lines are configured to transmit signals. A transmission line has a specific preferred transmission direction according to the manufacturing conditions or manufacturing quality of the conductive material of the transmission line. For example, when a signal is transmitted from a first terminal of the transmission line to a second terminal of a transmission line, the signal undergoes a first degradation. When the signal is transmitted from the second terminal of the transmission line to the first terminal of the transmission line, the signal undergoes a second degradation. If the first degradation is smaller than the second degradation, the direction of transmission from the first terminal of the transmission line to the second terminal of the transmission line is the preferred transmission direction.

However, there is currently no detection tool to determine the preferred transmission direction of a transmission line. For example, in the case of audio signal transmission lines, the current way to determine the first degradation and the second degradation is by the hearing of a detection person. This approach is too subjective and not always correct. Thus, it is one of the main research points in this field to provide a detection circuit for detecting the preferred transmission direction of transmission lines.

SUMMARY

The disclosure provides a detection circuit for detecting the transmission directionality of a transmission line, capable of detecting the preferred transmission direction of a transmission line.

A detection circuit of this disclosure is configured to detect a transmission line. The detection circuit includes a sending terminal, a receiving terminal, a detection signal generator, a comparison circuit, and an output circuit. The sending terminal is connected to a first terminal of the transmission line. The receiving terminal is connected to a second terminal of the transmission line. The detection signal generator is coupled to the sending terminal. The detection signal generator provides a detection signal to the sending terminal. The comparison circuit is coupled to the detection signal generator and the receiving terminal. The comparison circuit receives the detection signal from the detection signal generator and a transmission signal from the receiving terminal, and compares the detection signal and the transmission signal to generate a comparison result. The output circuit is coupled to the comparison circuit. The output circuit outputs one of a first detection result signal and a second detection result signal according to the comparison result.

According to the above, the comparison circuit compares the detection signal from the detection signal generator and the transmission signal from the receiving terminal to generate the comparison result. The output circuit outputs one of the first detection result signal and the second detection result signal according to the comparison result. The comparison result provided by the comparison circuit is a determination result associated with the preferred transmission direction of the transmission line. Thus, a user (e.g. a detection person) is able to know the preferred transmission direction of a transmission line according to one of the first detection result signal and the second detection result signal. In this way, the detection circuit is capable of providing a detection mechanism that accurately detects the preferred transmission direction of a transmission line.

In order to make the above features and advantages of the disclosure more obvious and understandable, the following embodiments are given below, together with the attached drawings, for detailed description as follows.

DESCRIPTION OF THE EMBODIMENTS

Some of the embodiments of the disclosure will be described in detail in conjunction with the accompanying drawings. For the component symbols referenced in the following description, when the same component symbols appear in different drawings, they will be considered the same or similar components. These embodiments are only a part of the disclosure and do not disclose all the manners in which the disclosure may be implemented. More precisely, these embodiments are only examples of the claims of the disclosure.

Figure 1:
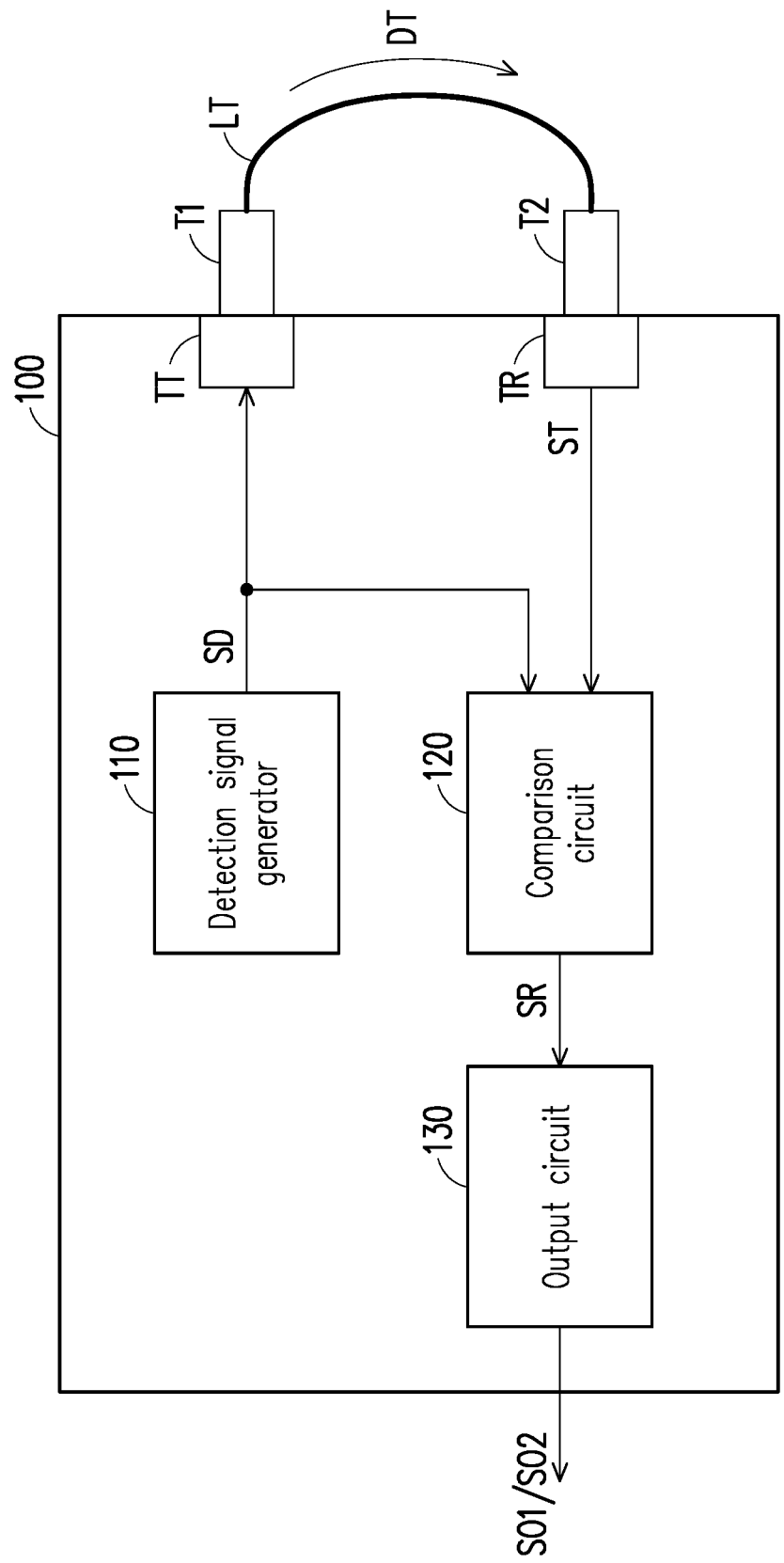
FIG. 1 is a schematic diagram of a detection circuit according to a first embodiment of the disclosure.

Referring to FIG. 1, FIG. 1 is a schematic diagram of a detection circuit according to a first embodiment of the disclosure. In this embodiment, a detection circuit 100 is configured to detect a preferred transmission direction of a transmission line LT. The transmission line LT is an arbitrary type of transmission line configured to transmit signals. In this embodiment, the detection circuit 100 includes a sending terminal TT, a receiving terminal TR, a detection signal generator 110, a comparison circuit 120, and an output circuit 130. The sending terminal TT is connected to a first terminal T1 of the transmission line LT. The receiving terminal TR is connected to a second terminal T2 of the transmission line LT. The detection signal generator 110 is coupled to the sending terminal TT. The detection signal generator 110 provides a detection signal SD to the sending terminal TT. Thus, the transmission line LT transmits the detection signal SD according to a direction DT.

In this embodiment, the comparison circuit 120 is coupled to the detection signal generator 110 and the receiving terminal TR. The comparison circuit 120 receives the detection signal SD from the detection signal generator 110 and a transmission signal ST from the receiving terminal TR. The transmission signal ST comes from the second terminal T2 of the transmission line LT. The transmission signal ST is a result of transmission of the detection signal SD according to the direction DT. Thus, the transmission signal ST is regarded as the real transmission result of the transmission line LT. The comparison circuit 120 also compares the detection signal SD and the transmission signal ST to generate a comparison result SR. Thus, the comparison result SR is associated with the difference between the real transmission result of the transmission line LT and the detection signal SD. The difference is associated with whether the preferred transmission direction of the transmission line is the same as the direction DT or opposite to the direction DT.

In this embodiment, the output circuit 130 is coupled to the comparison circuit 120, and the output circuit 130 receives the comparison result SR. The output circuit 130 outputs one of a first detection result signal SO1 and a second detection result signal SO2 according to the comparison result SR. For example, when the above difference is large, the output circuit 130 outputs the first detection result signal SO1. On the other hand, when the above difference is small, the output circuit 130 outputs the second detection result signal SO2. Thus, when the output circuit 130 outputs the first detection result signal SO1, the preferred transmission direction is opposite to the direction DT. When the output circuit 130 outputs the second detection result signal SO2, the preferred transmission direction is the same as the direction DT.

In other words, the first detection result signal SO1 indicates that the first terminal T1 of the transmission line LT is suitable as a signal sending terminal and indicates that the second terminal T2 of the transmission line LT is suitable as a signal receiving terminal. The second detection result signal SO2 indicates that the first terminal T1 of the transmission line LT is suitable as the signal receiving terminal and indicates that the second terminal T2 of the transmission line LT is suitable as the signal sending terminal.

It is worth mentioning that the comparison circuit 120 compares the detection signal SD from the detection signal generator 110 and the transmission signal ST from the receiving terminal TR to generate the comparison result SR. The output circuit 130 outputs one of the first detection result signal SO1 and the second detection result signal SO2 according to the comparison result SR. The comparison result SR provided by the comparison circuit 120 is a determination result associated with the preferred transmission direction of the transmission line LT. Thus, a user (e.g. a detection person) is able to know the preferred transmission direction of the transmission line LT according to one of the first detection result signal SO1 and the second detection result signal SO2. In this way, the detection circuit 100 is capable of providing a detection mechanism that accurately detects the preferred transmission direction of the transmission line LT.

Figure 2:
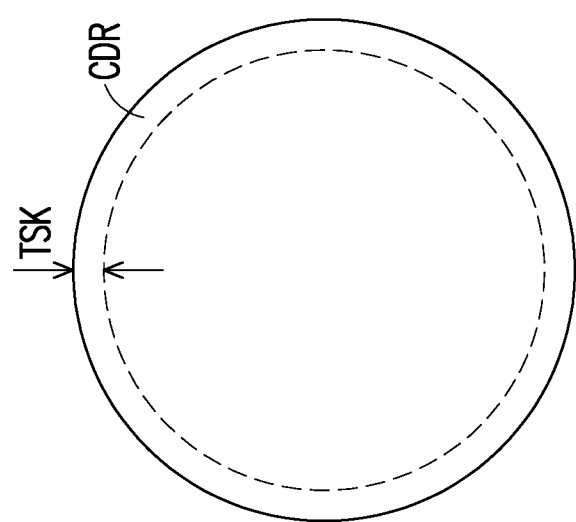
FIG. 2 is a schematic cross-sectional diagram of a conductive material of a transmission line according to an embodiment of the disclosure.

Referring to both FIG. 1 and FIG. 2, FIG. 2 is a schematic cross-sectional diagram of a conductive material of a transmission line according to an embodiment of the disclosure. FIG. 2 illustrates a conductive material CDR of the transmission line LT. In this embodiment, the detection signal SD has an operation frequency. The conductive material CDR has a corresponding skin depth TSK at the operation frequency, and the skin depth TSK is negatively correlated with the operation frequency. The higher the operation frequency, the smaller the skin depth TSK of the conductive material CDR. The lower the operation frequency, the larger the skin depth TSK of the conductive material CDR. Thus, the detection signal SD is transmitted within the range of the skin depth TSK of the conductive material CDR. In this embodiment, the operation frequency of the detection signal SD may be adjusted by the detection signal generator 110.

It should be noted that the intensity (or, amplitude) of the transmission signal ST is associated with the material surface condition of the conductive material CDR of the transmission line LT. The material surface condition is associated with the manufacturing conditions or manufacturing quality of the transmission line LT. According to the manufacturing conditions or manufacturing quality, the detection signal SD will have different intensity degradation in different transmission directions. Thus, the intensity of the transmission signal ST will be different in different transmission directions.

For example, the transmission line LT is an audio signal transmission line (the disclosure is not limited thereto). The audio signal is transmitted in the skin depth TSK of the conductive material CDR of the transmission line LT. The operation frequency of the detection signal SD is set within the audio frequency range of the audio signal. Thus, the intensity of the transmission signal ST may be associated with the material surface condition of the conductive material CDR of the transmission line LT.

Figure 3:
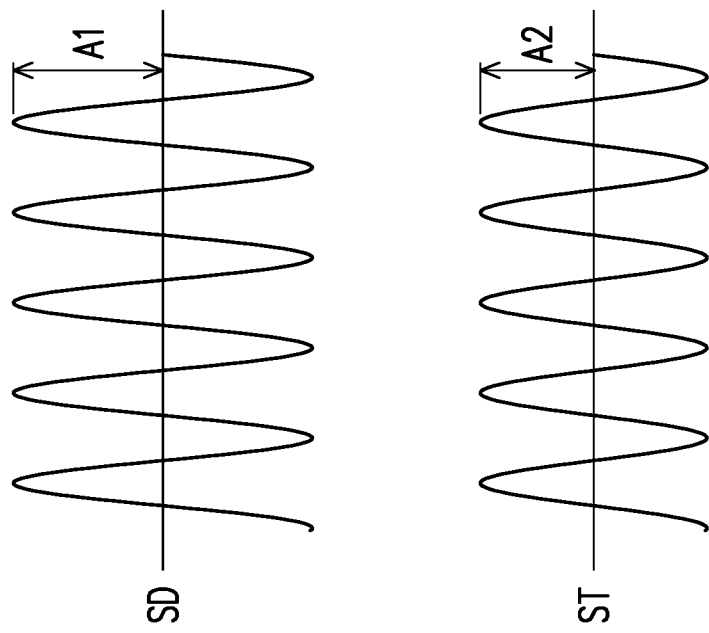
FIG. 3 is a waveform diagram of a detection signal and a transmission signal according to an embodiment of the disclosure.

Referring to both FIG. 1 and FIG. 3, FIG. 3 is a waveform diagram of a detection signal and a transmission signal according to an embodiment of the disclosure. FIG. 3 illustrates the waveform of the detection signal SD and the waveform of the transmission signal ST. In this embodiment, the transmission signal ST is a result of transmission of the detection signal SD according to the direction DT. Thus, the frequency of the transmission signal ST will follow the operation frequency of the detection signal SD.

In this embodiment, the detection signal SD has intensity A1, the transmission signal ST has intensity A2, and the intensity A2 of the transmission signal ST is not the same in different transmission directions. For example, when the detection signal SD is transmitted in the preferred transmission direction of the transmission line LT, the intensity A2 of the transmission signal ST approximates the intensity A1 of the detection signal SD. On the other hand, when the detection signal SD is transmitted in the transmission direction opposite to the preferred transmission direction, the intensity A2 of the transmission signal ST is smaller than the intensity A1 of the detection signal SD.

The comparison circuit 120 generates the comparison result SR according to a difference value between the intensity A1 of the detection signal SD and the intensity A2 of the transmission signal ST. For example, when the difference value is larger than a set value, the comparison circuit 120 generates the comparison result SR having a first value. On the other hand, when the difference value is smaller than or equal to the set value, the comparison circuit 120 generates the comparison result SR having a second value. The first value and the second value are respectively different one of a logic value, a voltage value, and a digital value. In this embodiment, the set value may be set according to the actual usage requirements or the quality of the transmission line LT.

In this embodiment, the output circuit 130 outputs the first detection result signal SO1 according to the comparison result SR having the first value, and outputs the second detection result signal SO2 according to the comparison result SR having the second value.

Figure 4:
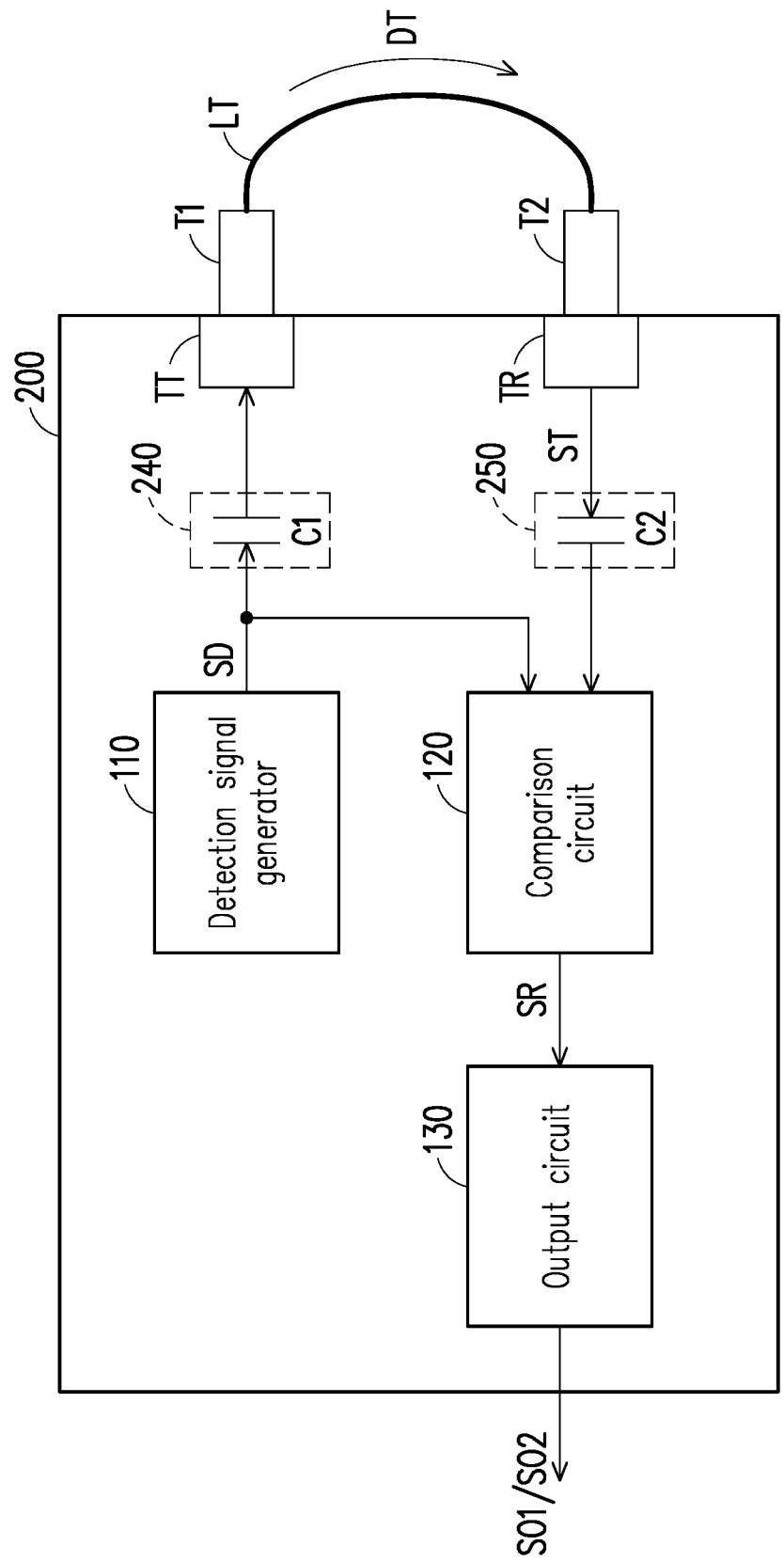
FIG. 4 is a schematic diagram of a detection circuit according to a second embodiment of the disclosure.

Referring to FIG. 4, FIG. 4 is a schematic diagram of a detection circuit according to a second embodiment of the disclosure. In this embodiment, a detection circuit 200 includes the sending terminal TT, the receiving terminal TR, the detection signal generator 110, the comparison circuit 120, the output circuit 130, and a filter circuit 240. The implementation details of the sending terminal TT, the receiving terminal TR, the detection signal generator 110, the comparison circuit 120, and the output circuit 130 have been clearly described in the various embodiments in FIGS. 1 through 3, and are not repeated here. In this embodiment, the filter circuit 240 is coupled between the detection signal generator 110 and the sending terminal TT. The filter circuit 240 filters out low-frequency noise and Direct Current Bias (DC bias) of the detection signal SD. The detection signal SD may be transmitted in the skin depth of the conductive material of the transmission line LT. In this way, the association between the result of the transmission signal ST and the material surface condition of the conductive material of the transmission line LT is more significant. The sensitivity of the transmission signal ST to change with the material surface condition is also higher.

Taking the present embodiment as an example, the filter circuit 240 includes at least a capacitor C1 (the disclosure is not limited thereto). The capacitor C1 is coupled between the detection signal generator 110 and the sending terminal TT.

In some embodiments, the filter circuit 240 may be provided in the detection signal generator 110.

In this embodiment, the detection circuit 200 further includes a filter circuit 250. The filter circuit 250 is coupled between the comparison circuit 120 and the receiving terminal TR. In the use of the detection circuit 200, the transmission line LT may suffer from external coupling interference so that the transmission signal ST has low-frequency noise and DC bias. The low-frequency noise and DC bias cause a shift in the intensity of the transmission signal ST, which causes the comparison circuit 120 to generate an incorrect comparison result SR. The filter circuit 250 may filter out the low-frequency noise and DC bias of the transmission signal ST. Thus, the filter circuit 250 can reduce the risk of generating an incorrect comparison result SR by the comparison circuit 120.

In this embodiment, the filter circuit 250 includes at least a capacitor C2 (the disclosure is not limited thereto). The capacitor C2 is coupled between the comparison circuit 120 and the receiving terminal TR.

In some embodiments, the filter circuit 250 may be provided in the comparison circuit 120.

In some embodiments, one of the filter circuits 240, 250 may be omitted from the detection circuit 200 according to practical usage requirements.

Figure 5:
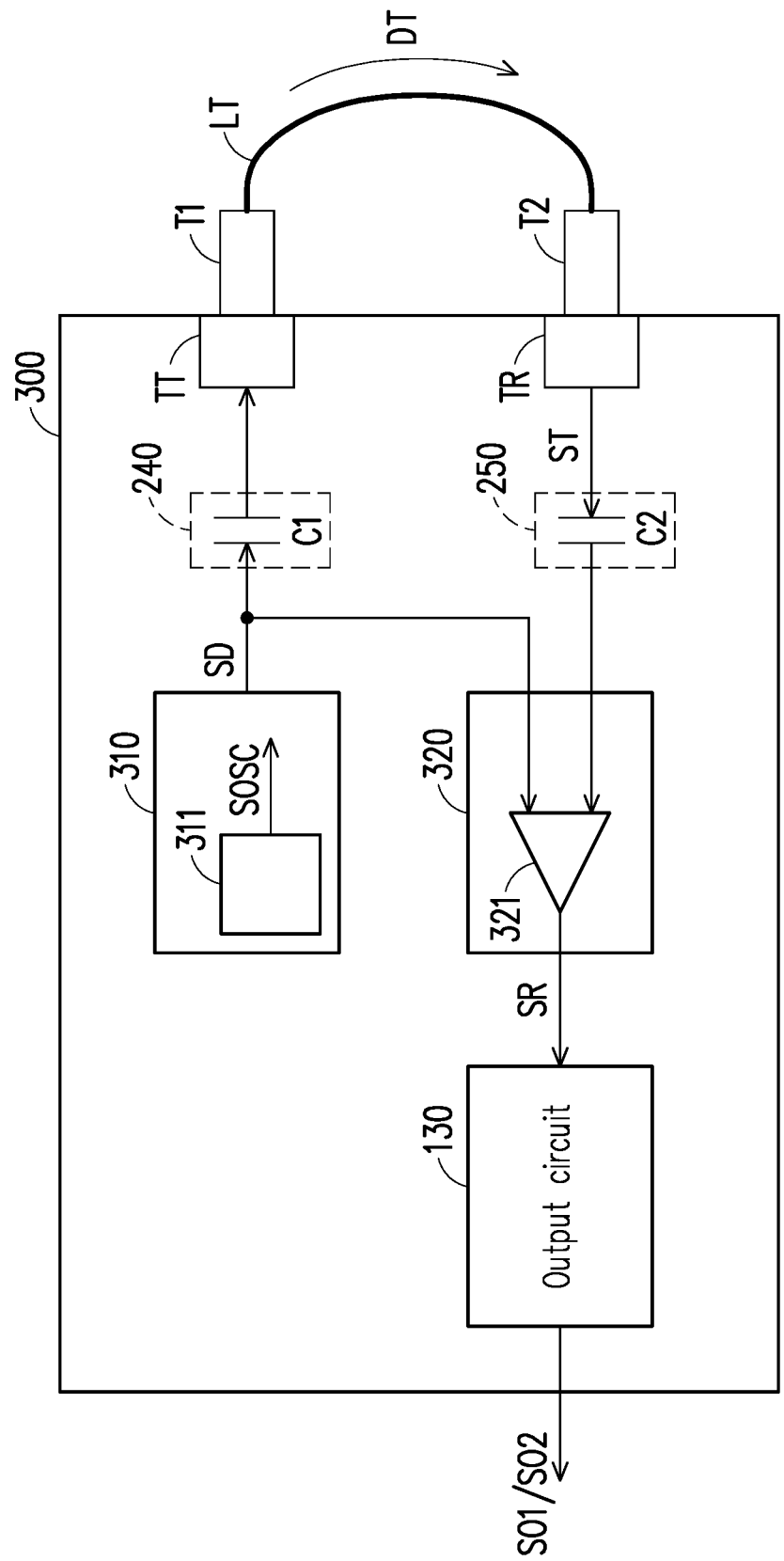
FIG. 5 is a schematic diagram of a detection circuit according to a third embodiment of the disclosure.

Referring to FIG. 5, FIG. 5 is a schematic diagram of a detection circuit according to a third embodiment of the disclosure. In this embodiment, the detection circuit 200 includes the sending terminal TT, the receiving terminal TR, a detection signal generator 310, a comparison circuit 320, the output circuit 130, the filter circuit 240, and the filter circuit 250. An oscillator 311 provides an oscillation signal SOSC, and the detection signal generator 310 outputs the detection signal SD according to the oscillation signal SOSC. The detection signal generator 310 includes the oscillator 311. For example, the detection signal generator 310 gains the amplitude of the oscillation signal SOSC to generate the detection signal SD. For example, the detection signal generator 310 adjusts the frequency of the oscillation signal SOSC (e.g. divides or multiplies the frequency) to generate the detection signal SD. In other words, the frequency of the detection signal SD is associated with the frequency of the oscillation signal SOSC. In this embodiment, the oscillator 311 is implemented, for example, by a quartz oscillator or a voltage-controlled oscillator (VCO) (the disclosure is not limited thereto).

In this embodiment, the comparison circuit 320 includes a comparator 321. A first input terminal of the comparator 321 receives the detection signal SD. A second input terminal of the comparator 321 receives the transmission signal ST. An output terminal of the comparator 321 is configured to output the comparison result SR. The comparator 321 compares the detection signal SD with the transmission signal ST. When a difference value between the intensity of the detection signal SD and the intensity of the transmission signal ST is larger than a set value, an output terminal of the comparator 321 is configured to output the comparison result SR having the first value (e.g. a high voltage value), and when the difference value is smaller than or equal to the set value, the output terminal of the comparator 321 is configured to output the comparison result SR having the second value (e.g. a low voltage value).

Figure 6:
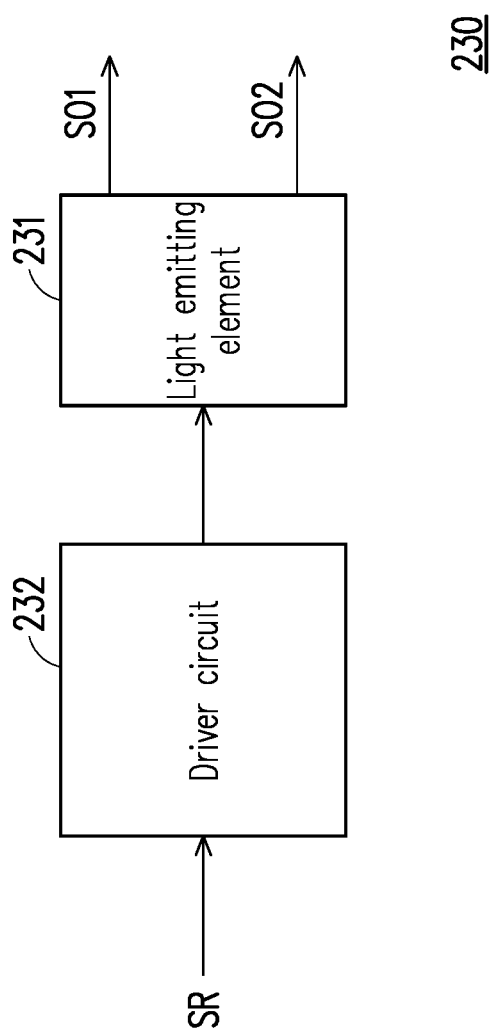
FIG. 6 is a schematic diagram of an output circuit according to an embodiment of the disclosure.

Referring to both FIG. 1 and FIG. 6, FIG. 6 is a schematic diagram of an output circuit according to an embodiment of the disclosure. In this embodiment, an output circuit 230 includes a light emitting element 231 and a driver circuit 232. The driver circuit 232 is coupled to the light emitting element 231 and the comparison circuit 120. The driver circuit 232 receives the comparison result SR from the comparison circuit 120. The driver circuit 232 drives the light emitting element 231 according to the comparison result SR having the first value. Thus, the light emitting element 231 outputs the first detection result signal SO1. Moreover, the driver circuit 232 drives the light emitting element 231 according to the comparison result SR having the second value. Thus, the light emitting element 231 outputs the second detection result signal SO2.

For example, a light emitting element 231-1 may be implemented by a plurality of light emitting units with a plurality of different color light signals. For example, the light emitting unit may be a light emitting diode of any type. The first detection result signal SO1 and the second detection result signal SO2 are different color light signals respectively. For example, the first detection result signal SO1 is a red light signal (the disclosure is not limited thereto). The second detection result signal SO2 is a green light signal (the disclosure is not limited thereto). In this way, the user (e.g. the detection person) is able to know the preferred transmission direction of the transmission line according to the color of the light signal. For example, when the light signal is red, it means that the preferred transmission direction is opposite to the direction DT; when the light signal is green, it means that the preferred transmission direction is the same as the direction DT.

Figure 7:
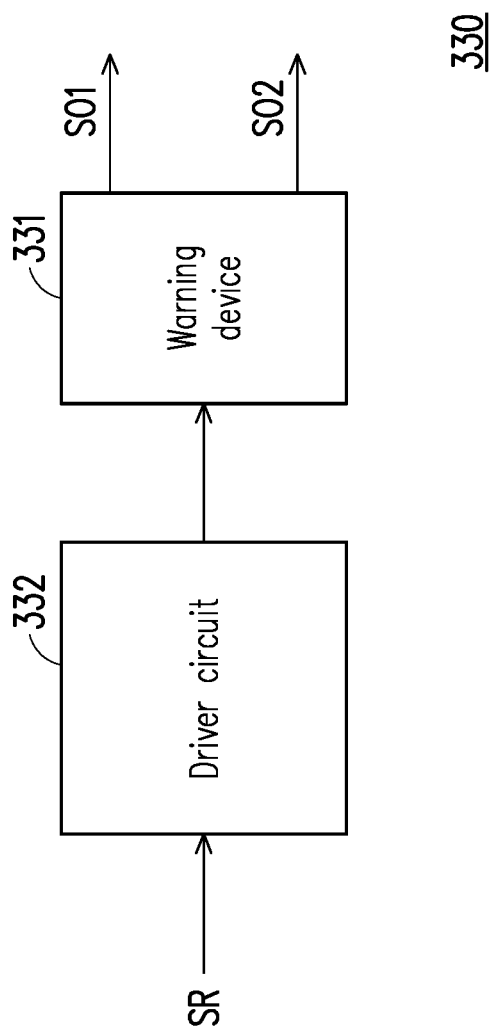
FIG. 7 is a schematic diagram of an output circuit according to an embodiment of the disclosure.

Referring to both FIG. 1 and FIG. 7, FIG. 7 is a schematic diagram of an output circuit according to an embodiment of the disclosure. In this embodiment, an output circuit 330 includes a warning device 331 and a driver circuit 332. The driver circuit 332 is coupled to the warning device 331 and the comparison circuit 120. The driver circuit 232 controls the warning device 331 to output the first detection result signal SO1 according to the comparison result SR having the first value. The first detection result signal SO1 is a first warning audio signal. Moreover, the driver circuit 232 controls the warning device 331 to output the second detection result signal SO2 according to the comparison result SR having the second value. The second detection result signal SO2 is a second warning audio signal. The first warning audio signal is different from the second warning audio signal. In this way, the user (e.g. the detection person) is able to know the preferred transmission direction of the transmission line according to the warning audio signal. In this embodiment, the warning device 331 may be a speaker.

In some embodiments, the warning device 331 may generate different vibrations. The driver circuit 332 outputs the first detection result signal SO1 according to the comparison result SR having the first value. The first detection result signal SO1 is a first warning vibration. The driver circuit 332 controls the warning device 331 to output the second detection result signal SO2 according to the comparison result SR having the second value. The second detection result signal SO2 is a second warning vibration. The first warning vibration is different from the second warning vibration. In this way, the user (e.g. the detection person) is able to know the preferred transmission direction of the transmission line according to the warning vibration. In these embodiments, the warning device 331 may be a vibration generating element.

In summary, the comparison circuit of the disclosure receives a detection signal from a detection signal generator and a transmission signal from a receiving terminal. The comparison circuit compares the detection signal and the transmission signal to generate a comparison result. The output circuit outputs one of the first detection result signal and the second detection result signal according to the comparison result. The comparison result provided by the comparison circuit is the determination result associated with the preferred transmission direction of the transmission line. Thus, a user (e.g. a detection person) is able to know the preferred transmission direction of a transmission line according to one of the first detection result signal and the second detection result signal. In this way, the detection circuit may provide a detection mechanism that accurately detects the preferred transmission direction of a transmission line. In some embodiments, a filter circuit is configured to remove low-frequency noise and DC bias from the detection signal. The detection signal may be transmitted in the skin depth of the conductive material of the transmission line. In this way, the association between the result of the transmission signal from the transmission line and the material surface condition of the conductive material of the transmission line is more significant. Moreover, in some embodiments, a filter circuit is configured to remove low-frequency noise and DC bias from the transmission signal. In this way, the risk of incorrect comparison results from the comparison circuit can be reduced.

Although the disclosure has been disclosed by way of embodiments, it is not intended to limit the disclosure. Any person with ordinary knowledge in the field of the technology to which it belongs may, within the spirit and scope of the disclosure, make some modifications and embellishments, such that the scope of protection of the disclosure shall be subject to the scope of the patent application attached hereto.

What is claimed is:

1. A detection circuit for detecting transmission directionality of a transmission line, the detection circuit comprising:
    a sending terminal, connected to a first terminal of the transmission line;
    a receiving terminal, connected to a second terminal of the transmission line;
    a detection signal generator, coupled to the sending terminal and configured to provide a detection signal to the sending terminal;
    a comparison circuit, coupled to the detection signal generator and the receiving terminal and configured to receive the detection signal from the detection signal generator and a transmission signal from the receiving terminal, and to compare the detection signal and the transmission signal to generate a comparison result; and
    an output circuit, coupled to the comparison circuit and configured to output one of a first detection result signal and a second detection result signal according to the comparison result.

2. The detection circuit according to claim 1,
    wherein the detection signal has an operation frequency, and
    the operation frequency is associated with a skin depth of a conductive material of the transmission line.

3. The detection circuit according to claim 2, wherein an intensity of the transmission signal is associated with a material surface condition of the conductive material of the transmission line.

4. The detection circuit according to claim 1,
    wherein the comparison circuit generates the comparison result according to a difference value between an intensity of the detection signal and an intensity of the transmission signal, and
    when the difference value is larger than a set value, the comparison circuit generates the comparison result having a first value; and
    when the difference value is smaller than or equal to the set value, the comparison circuit generates the comparison result having a second value.

5. The detection circuit according to claim 4, wherein the output circuit outputs the first detection result signal according to the comparison result having the first value, and outputs the second detection result signal according to the comparison result having the second value.

6. The detection circuit according to claim 5, wherein the first detection result signal indicates that the first terminal of the transmission line is suitable as a signal sending terminal and the second terminal of the transmission line is suitable as a signal receiving terminal.

7. The detection circuit according to claim 5, wherein the second detection result signal indicates that the first terminal of the transmission line is suitable as a signal receiving terminal and the second terminal of the transmission line is suitable as a signal sending terminal.

8. The detection circuit according to claim 4, wherein the output circuit comprises:
    a light emitting element; and
    a driver circuit, coupled to the light emitting element and to the comparison circuit and configured to:
        drive the light emitting element according to the comparison result having the first value, such that the light emitting element outputs the first detection result signal, and drive the light emitting element according to the comparison result having the second value, such that the light emitting element outputs the second detection result signal.

9. The detection circuit according to claim 4, wherein the output circuit comprises:
a warning device; and
a driver circuit, coupled to the warning device and to the comparison circuit and configured to:
control the warning device to output the first detection result signal according to the comparison result having the first value, and
control the warning device to output the second detection result signal according to the comparison result having the second value,
wherein the first detection result signal is a first warning audio signal, and the second detection result signal is a second warning audio signal.

10. The detection circuit according to claim 4, wherein the output circuit comprises:
a warning device; and
a driver circuit, coupled to the light emitting element and to the comparison circuit and configured to
control the warning device to output the first detection result signal according to the comparison result having the first value, and
control the warning device to output the second detection result signal according to the comparison result having the second value,
wherein the first detection result signal is a first warning vibration, and the second detection result signal is a second warning vibration.

11. The detection circuit according to claim 1, wherein the detection signal generator comprises:
an oscillator, configured to provide an oscillation signal,
wherein the detection signal generator outputs the detection signal according to the oscillation signal.

12. The detection circuit according to claim 1, further comprising:
a filter circuit, coupled between the detection signal generator and the sending terminal and configured to filter out low-frequency noise and DC bias of the detection signal.

13. The detection circuit according to claim 1, further comprising:
a filter circuit, coupled between the comparison circuit and the receiving terminal and configured to filter out low-frequency noise and DC bias of the transmission signal.

14. The detection circuit according to claim 1, wherein the comparison circuit comprises:
a comparator, wherein a first input terminal of the comparator receives the detection signal, a second input terminal of the comparator receives the transmission signal, and an output terminal of the comparator outputs the comparison result.

* * * * *